Figure 1:
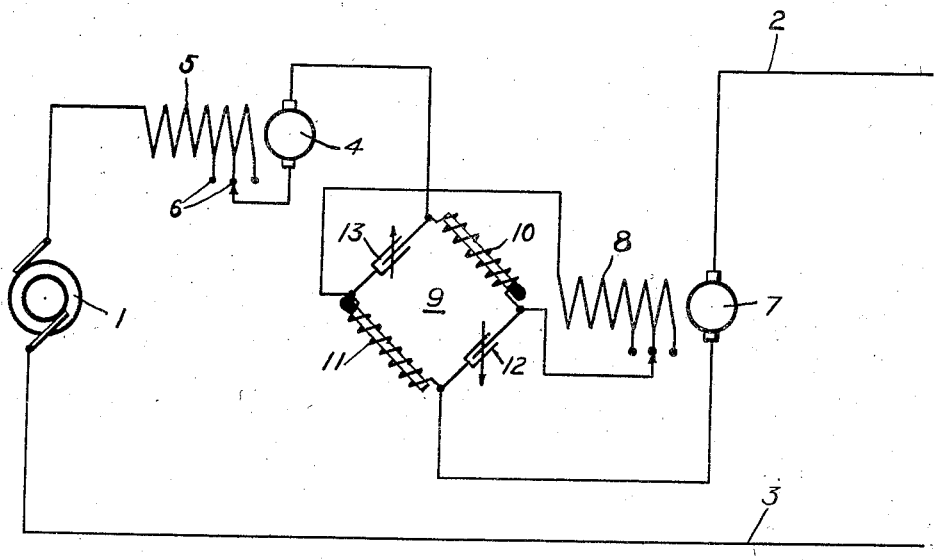

C. LE G. FORTESCUE.
REGULATING SYSTEM.
APPLICATION FILED MAY 2, 1918. RENEWED OCT. 9, 1920.

1,376,424.

Patented May 3, 1921.

WITNESSES:

INVENTOR
Charles Le G. Fortescue
BY
ATTORNEY

UNITED STATES PATENT OFFICE.

CHARLES LE G. FORTESCUE, OF PITTSBURGH, PENNSYLVANIA, ASSIGNOR TO WESTINGHOUSE ELECTRIC AND MANUFACTURING COMPANY, A CORPORATION OF PENNSYLVANIA.

REGULATING SYSTEM.

1,376,424. Specification of Letters Patent. Patented May 3, 1921.

Original application filed November 7, 1916, Serial No. 129,976. Divided and this application filed May 2, 1918, Serial No. 232,148. Renewed October 9, 1920. Serial No. 415,953.

*To all whom it may concern:*

Be it known that I, CHARLES LE G. FORTESCUE, a subject of the King of Great Britain, and a resident of Pittsburgh, in the county of Allegheny and State of Pennsylvania, have invented a new and useful Improvement in Regulating Systems, of which the following is a specification, this application being a division of application Serial No. 129,976, filed Nov. 7, 1916.

My invention relates to electrical distributing systems and it has special relation to means embodied in such systems to compensate for the various line losses, such as result, for instance, from the reactance and resistance of such distributing systems.

While many systems have heretofore been proposed to accomplish this compensating result, all of such systems have been more or less inefficient in operation because of the inherent difficulties attendant upon the use of electromagnets, relays, etc. Another difficulty has arisen from the fact that all of such devices possess more or less of a time lag in responding to the changes of load and power factor occurring in the distributing system which they control. Frequently, however, a system which is so designed as to be delicate enough to respond readily to such controlling means is of too complex a nature to respond rapidly to fluctuations of large magnitude in the load which may be derived from said distributing system and is, moreover, seldom of sufficient ruggedness to withstand such violent changes. Furthermore, with the compensating means now commonly employed in distributing systems, it is always more or less of a problem to superpose upon said distributing system, a compensating electromotive force of the proper phase position, this difficulty arising, of course, from the fact that it is almost impossible to obtain a pure reactive voltage or a pure resistance voltage and thereafter to superpose the same on the system which is to be compensated, in order to adequately wipe out the impedance drop obtaining in such system.

By the use of a system embodying my compensating means, I am able to superpose upon the distributing system in which it is desired to compensate for the impedance drop, an electromotive force exactly equal to, and exactly in the proper phase relation with the voltage representing the drop caused by the reactance and resistance of the distributing system. To this end, I make use of alternating current, commutator-type, series generators connected in series with the distributing system and running preferably at a constant speed. Such a machine will give a voltage in phase with, and proportional to, the exciting current. If, therefore, through the field of such a machine, the line current be passed and its armature be connected in series with said line, the voltage generated thereby will always be proportional to, and in exact phase coincidence with, the line currents. Furthermore, if another series commutator generator have its armature connected in series with the line and its field excited by a current which is proportional to, and exactly 90° in phase position from, the line current, this machine will generate a voltage which is 90° in phase position from the line current, this last voltage being proportional to, and of the same frequency as, the reactance drop in the electrical distributing system.

The two voltages generated by the above machines, as above set forth, will combine vectorially to form a voltage which is equal to, and exactly 180° in phase position from, the impedance drop of said distributing system.

As is hereinafter pointed out, it may, at times, be desirable to so combine the two machines that but one armature is used, said resulting machine being excited by two field windings, the current in one being in phase with that flowing in the line while the current in the second field winding is, by means of the interposition between the line and said field of a phase-modifying device, 90° in phase position from the line current. Such a machine, when connected in series with the distributing system, will exert the same compensating influence, as has been hereinbefore described, as is exerted by the two separate machines.

It will be obvious that, by the use of such compensating means as I have indicated above and will hereinafter more specifically describe and claim, a perfect compensation for the impedance drop in a distribution system is obtained and, moreover, a minimum of moving parts is employed in such means. It will, furthermore, be observed that, after an initial adjustment of the fields of the commutator-type series generators, the system becomes inherently self-compensating and performs the desired regulating functions without the use of relays, magnets, etc.

For a better understanding of my invention, reference may be had to the accompanying drawing in which—

Figure 2:
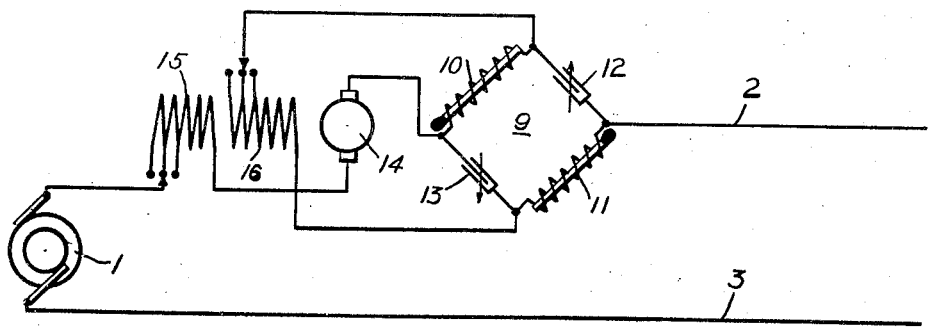
Figure 3:
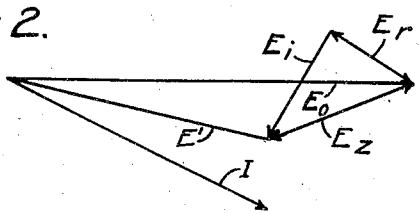

Figure 1 is a diagrammatic view of the connections used with my improved compensating system when two machines are employed; Fig. 2 is a view of the system when the two machines are combined and but one armature is employed; and Fig. 3 is a vector diagram showing the voltage and current relations of the line and the compensating means.

Referring more specifically to Fig. 1, an alternator 1, adapted to furnish energy to a distribution system and represented by the mains 2 and 3, is shown. Connected in series to the main 2 is an armature 4 of a series, commutator-type generator, said generator being excited by the current flowing in a field winding 5 which is shown as provided with adjustable taps 6. Also connected in series with the main 2 is a second commutator generator 7, provided with a field winding 8, excited by a current derived from a phase-modifying device 9, here shown, for purposes of illustration, as a static network in the form of a bridge composed of inductance arms 10 and 11 and condensive arms 12 and 13, all of the arms being shown adjustable.

It is obvious that, by the use of such an adjustable phase-modifying bridge 9, I am able to excite the field 8 with a current 90° in phase position from the line current and to thereby superpose a voltage removed 90° in phase position from the line current upon the mains of the distribution system, or one that is exactly in correct phase relationship with the reactance drop voltage obtaining in the distribution system.

In Fig. 2 I have shown a system analogous to that above explained in connection with Fig. 1, with the difference that the machine here used as a compensating means comprises but one armature 14. The machine embodying the armature 14 is excited by means of two fields 15 and 16, the field 15 being traversed by the line current and the field 16 being traversed by the current derived from the independent corners of the phase-modifying device 9, said device being provided, as explained in connection with Fig. 1, with adjustable inductive and condensive arms.

Considering the armature 14 as excited by the current traversing the field 15, it will be apparent that a voltage is generated therein which is proportional to, and in phase with, the line current, and considering the same armature as excited by the field 16, it will be further seen that a voltage proportional to, but 90° in phase position from, the line current is generated therein. The resultant of these two voltages, when superposed upon the distribution system, is a voltage which is equal to, but 180° removed in phase position from, the impedance drop voltage in said distributing system. This drop will, therefore, be entirely wiped out and the system will become an inherently compensated one.

Reference to Fig. 3 will explain the vectorial relation of the currents and voltages of the distribution system and the compensating means. The vector $Eo$ represents the voltage at the terminals of the alternator, while $I$ represents the current flowing in the system which, it will be observed, is lagging somewhat behind the terminal voltage. The voltage drop, due to the line resistance, may be represented by the vector $Er$ which is, of course, in phase with the line current and opposed thereto. The drop due to the reactance of the distribution system will be 90° removed in phase position from the drop due to the resistance of the system and will, therefore, be represented by the vector $Ei$. The vectorial sum of the resistance and reactive drops in the system will, therefore, be indicated by the vector $Ez$ which, when added, in the proper direction, to the generated voltage $Eo$, will give, as the resultant voltage obtaining in the system,—when the drops are uncompensated,—a voltage represented by the vector $E'$. It is, apparent, therefore, that, if a machine is incorporated in said system which will generate a voltage equal to, and 180° in phase position from, the impedance drop $Ez$, the same will be eliminated, and the distribution system will operate with perfect inherent regulation.

While I have shown my machines as separately driven and, therefore, capable of disposition at an appreciable distance from the generating station, it is obvious that the same may be placed on the same shaft as, and in proximity to, the alternator furnishing energy to said distribution system. Moreover, I have herein described, for purposes of illustration, the phase-modifying device as comprising what is known as a "monocyclic square" arrangement, but it will be obvious to those skilled in the art that other means may be employed to accomplish the same purpose, although it is apparently impossible to obtain an exact quadrature relationship without the employment of a device analogous to that which I have indicated.

While I have described but two embodiments of my invention, I desire that only such limitations shall be placed thereon as may be imposed by the prior art or by the scope of the appended claims.

I claim as my invention:

1. The combination with an electrical system, and means for impressing thereupon an alternating-current electromotive force, of means connected in series therewith to compensate for the drops in said electrical system, said means operating to superpose on said electrical system an electromotive force component in phase with the current therein and an electromotive force component in quadrature relationship to the current therein.

2. The combination with an electrical system, and means for impressing thereupon an alternating-current electromotive force, of means connected in series therewith to compensate for certain potential drops in said electric system, said means being so connected to said electrical system that electromotive forces in phase with, and proportional to, the current, and in phase with, and proportional to, the inductive drop, respectively, shall be superposed on said electrical system.

3. The combination with an electrical system, and means for impressing thereupon an alternating-current electromotive force, of means connected in series therewith to compensate for the drops in said electrical system, the electromotive forces generated by said means being so automatically varied that, after an initial adjustment, said means respond inherently to the changes in the magnitude and power-factor of the current in said electrical system.

4. The combination with an electrical system, and means for impressing thereupon an alternating-current electromotive force, of auxiliary sources of electromotive force connected in series with said electrical system, said sources generating electromotive forces that are displaced ninety degrees from each other, and means for automatically adjusting the value of said electromotive forces to exactly and inherently compensate for the drops in a given portion of said electrical system.

5. The combination with an electrical system and means for impressing thereupon an alternating-current electromotive force, of an alternating-current, commutator-type, series generator aggregate connected in series with said electrical system in order to generate an electromotive force that is proportional to, and of the same frequency as, the current traversing said electrical system.

6. The combination with an electrical system, and means for impressing thereupon an alternating-current electromotive force, of a plurality of alternating-current, commutator-type series generators connected in series with said electrical system in order to generate an electromotive force that is proportional to, and of the same frequency as, the current traversing said electrical system, and phase-modifying means associated with one of said generators, whereby the electromotive force generated thereby will be displaced in phase from the electromotive force generated by the other generator.

7. The combination with an electrical system, and means for impressing thereupon an alternating-current electromotive force, of a plurality of alternating-current, commutator-type series generators connected in series with said electrical system in order to generate an electromotive force that is proportional to, and of the same frequency as, the current traversing said electrical system, and phase-modifying means associated with one of said generators, said phase-modifying means comprising reactances so adjustably arranged that the electromotive force of said last named series generator inherently compensates for the reactance drop obtaining in said electrical system.

8. The combination with an electrical system, and means for impressing thereupon an alternating-current electromotive force, of a plurality of alternating-current, commutator-type series generators connected in series with said electrical system in order to generate an electromotive force that is proportional to, and of the same frequency as, the current traversing said electrical system, and phase-modifying means associated with one of said generators, said phase-modifying means comprising reactances so adjustably arranged that the electromotive force of said last named series generator is maintained ninety degrees in phase position from the current flowing in said electrical system.

9. The combination with an electrical system, and means for impressing thereupon an alternating-current electromotive force, of means connected in series therewith to compensate for the drops in a given portion of said electrical system, said means comprising a single auxiliary dynamo-electric machine so excited and so driven that an electromotive force equal to, and exactly 180° in phase displacement from, the impedance drop in said electrical system is superposed upon said electrical system.

10. The combination with an electrical system, and means for impressing thereupon an alternating-current electromotive force, of means connected in series therewith to compensate for the drops in a certain portion of said electrical system, said means comprising a single auxiliary dynamo-electric machine, said auxiliary dynamo-electric machine being of the series commutator type and being provided with two field windings and being so excited and so driven that an electromotive force equal to, and 180° in phase displacement from, the impedance drop in said electrical system is superposed upon said electrical system.

11. The combination with an electrical system, and means for impressing thereupon an alternating-current electromotive force, of means connected in series therewith to compensate for the impedance drops in a certain portion of said electrical system, said means comprising a single auxiliary dynamo-electric machine, said auxiliary dynamo-electric machine being of the series commutator type and being provided with two field windings, phase-modifying means interposed between said electrical system and one of said field windings, said auxiliary dynamo-electric machine being so excited and so driven that an electromotive force approximately equal to, and 180° in phase displacement from, said impedance drops is superposed on said electrical system.

12. The combination with an electrical system, and means for impressing thereupon an alternating-current electromotive force, of means connected in series therewith to compensate for the drops in said electrical system, said means comprising a single auxiliary dynamo-electric machine, said auxiliary dynamo-electric machine being of the series commutator type and being provided with two field windings, phase-modifying means interposed between said electrical system and one of said field windings, one of said field windings being traversed by the current flowing in said electrical system, and the other of said field windings being traversed by current derived from said phase-modifying means, whereby the electromotive force generated by said series generator is equal to, and 180° in phase displacement from, the impedance drop in said electrical system.

13. An alternating-current booster adapted to neutralize the impedance of a device connected in series therewith, comprising a commutator-type dynamo-electric-machine aggregate having armature windings and a plurality of exciting field windings, said armature windings being adapted to be connected in series-circuit relationship with said device, and a phase converter connected in series-circuit relationship to said armature circuit, one of said exciting field windings being connected in series-circuit relationship to said armature circuit, and another of said exciting field windings being connected to the derived phase of said phase converter.

14. An alternating-current booster adapted to neutralize the impedance of a device connected in series therewith, comprising a commutator-type dynamo-electric-machine aggregate having armature windings and a plurality of exciting field windings, said armature windings being adapted to be connected in series-circuit relationship with said device, and a two-phase static network having one of its phases connected in series-circuit relationship to said armature circuit, one of said exciting field windings being connected in series-circuit relationship to said armature circuit, and another of said exciting field windings being connected to the derived phase of said static network.

15. The combination with an electrical system, and means for impressing thereupon an alternating-current electromotive force, of booster means connected in series-circuit relationship with said electrical system and having characteristics corresponding to the load characteristic of a given portion of said electrical system, said booster means generating electromotive-forces that are out of phase with each other, and means for initially adjusting the value of said electromotive-forces whereby said booster means will inherently compensate for the impedance drops in said given portion of said electrical system.

16. The combination with an electrical system, and means for impressing thereupon an alternating-current electromotive force, of auxiliary sources of electromotive force connected in series with said electrical system, said sources generating electromotive forces that are out of phase with each other, and means for automatically adjusting the value of said electromotive forces to compensate for the impedance drops in a given portion of said electrical system.

17. The combination with an alternating-current translating device, of means connected in series therewith to compensate for the impedance drop therein, said means comprising a single-phase commutator-type generator having a commutator-winding and a field-exciting winding, and phase-modifying means interposed between said translating device and said commutator-winding, said phase-modifying means supplying said field-exciting winding with current displaced in phase with respect to the current in said commutator-winding and proportional thereto, whereby the electromotive force generated by said commutator generator is substantially equal and opposite to the impedance drop in said translating device.

18. The combination with an alternating-current translating device, of a commutator-type dynamo-electric means connected in series therewith to compensate for the impedance drop therein, and means for exciting said dynamo-electric means with a current displaced from the current in said translating device and proportional thereto, whereby the electromotive force generated by said dynamo-electric means is substantially equal and opposite to the impedance drop in said translating device.

19. The combination with an alternating-current translating device, of a commutator-type dynamo-electric means connected in series therewith to compensate for the impedance drop therein, and means for exciting said dynamo-electric means with a current displaced approximately 90° with respect to the current in said translating device and proportional thereto, whereby the electromotive force generated by said dynamo-electric means is substantially equal and opposite to the impedance drop in said translating device.

20. The combination with an alternating current circuit, of means connected in series therewith to compensate for the impedance drop of a given portion thereof, said means comprising a single-phase commutator-type generator having a commutator winding connected in series with said system, and means for producing an alternating exciting field for said generator, said alternating field being proportional to the current in said system and displaced in time-phase with respect thereto, whereby the electromotive force generated by said commutator generator is substantially equal and opposite to the impedance drop in the given portion of said system.

In testimony whereof, I have hereunto subscribed my name this 29th day of April, 1918.

CHARLES LE G. FORTESCUE.